United States Patent
Fujii (10) Patent No.: US 9,319,102 B2
(45) Date of Patent: Apr. 19, 2016

(54) COMMUNICATION APPARATUS, COMMUNICATION SYSTEM, COMMUNICATION METHOD, AND STORAGE MEDIUM

(71) Applicant: CANON KABUSHIKI KAISHA, Tokyo (JP)

(72) Inventor: Daiki Fujii, Kawanishi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 22 days.

(21) Appl. No.: 14/294,751

(22) Filed: Jun. 3, 2014

(65) Prior Publication Data
US 2014/0362932 A1 Dec. 11, 2014

(30) Foreign Application Priority Data
Jun. 11, 2013 (JP) .................. 2013-123175

(51) Int. Cl.
    H04B 3/36 (2006.01)
    H04B 3/46 (2015.01)
    H04B 7/08 (2006.01)
    H04B 7/02 (2006.01)

(52) U.S. Cl.
    CPC ............... *H04B 3/46* (2013.01); *H04B 7/022* (2013.01); *H04B 7/082* (2013.01); *H04B 7/0814* (2013.01); *H04B 7/0871* (2013.01)

(58) Field of Classification Search
    None
    See application file for complete search history.

(56) References Cited

U.S. PATENT DOCUMENTS

| 6,788,194 B2 | 9/2004 | Yamashita ............. 340/447 |
| 7,555,076 B2 | 6/2009 | Maalej et al. ............. 375/347 |
| 2004/0012489 A1* | 1/2004 | Yamashita ......... B60C 23/0433 340/447 |
| 2006/0013346 A1 | 1/2006 | Maalej et al. ............. 375/347 |
| 2009/0092072 A1* | 4/2009 | Imamura ............ H04B 7/15542 370/315 |
| 2010/0118834 A1* | 5/2010 | Kalhan ................ H04W 48/08 370/336 |
| 2013/0093623 A1 | 4/2013 | Fujii ............. 342/367 |
| 2013/0242857 A1* | 9/2013 | Tani .................. H04B 7/15557 370/316 |

FOREIGN PATENT DOCUMENTS

| JP | 2004-056346 A | 2/2004 |
| JP | 2005-533405 A | 11/2005 |
| WO | WO 03/069802 A1 | 8/2003 |

* cited by examiner

*Primary Examiner* — Edward Urban
*Assistant Examiner* — Mohammed Rachedine
(74) *Attorney, Agent, or Firm* — Fitzpatrick, Cella, Harper & Scinto

(57) ABSTRACT

In a communication system, communication apparatuses provided with their respective antennas are wiredly connected in serial, and a control apparatus receives a signal based on a radio signal received by one of the communication apparatuses. In the system, one of the communication apparatuses determines whether reception quality of a radio signal received via the antenna thereof satisfies predetermined quality, and transmits, to a second communication apparatus or the control apparatus that is wiredly connected thereto, a signal based on the received radio signal if the reception quality satisfies the predetermined quality, and a signal based on a wired signal received from a first communication apparatus wiredly connected thereto if the reception quality does not satisfy the predetermined quality.

8 Claims, 8 Drawing Sheets

COMMUNICATION APPARATUS, COMMUNICATION SYSTEM, COMMUNICATION METHOD, AND STORAGE MEDIUM

BACKGROUND OF THE INVENTION

1. Field of the Invention

The present invention relates to a diversity reception technique.

2. Description of the Related Art

In radio communication, it is known that a multipath environment is established in which a plurality of elementary waves that have propagated via various propagation paths arrive at a reception apparatus at different timings, and transmission error may occur due to distortion of received waveforms in some locations. In such a multipath environment, space diversity is widely known as a technique to improve communication quality. In space diversity, simultaneous communications are performed by spatially distancing a plurality of antennas from one another so as to take advantage of the fact that communication quality significantly fluctuates depending on positions of antennas. In this way, for example, radio signals received via the plurality of antennas have different levels of communication quality, thereby increasing the probability of achieving sufficient reception quality via at least one of the antennas. It should be noted that a reception apparatus can obtain reception data from a plurality of signals received via a plurality of antennas, for example, by demodulating the received signals through application of selection combining or maximum ratio combining to the received signals, or by performing maximum likelihood estimation based on the received signals.

It is thought that the aforementioned diversity effects can further be enhanced by a spatially-wide distribution of a plurality of antennas (diversity branches). In this case, the plurality of antennas that have been distributed over a wide area are spatially distanced from a control function unit that executes reception processing such as selection combining, and therefore the control function unit is wiredly connected to the plurality of antennas via cables and the like. Signals received via the plurality of antennas are transmitted to the control function unit via wired transmission paths, and the control function unit applies reception processing to the received signals.

It should be mentioned that, in the case where the control function unit is wiredly connected to the plurality of antennas, the control function unit needs to include interfaces for wired communication that are equal to or larger than the plurality of antennas in number. In order not to affect the communication speed in an entire communication system utilizing both radio sections and wired sections, these interfaces for wired communication are required to perform communication at a speed higher than the speed in the radio sections. For example, in a radio communication system where an uncompressed high-definition video is transmitted from a transmitter by radio and received by a site-diversity radio reception station, the control function unit needs to include a plurality of interfaces for wired communication of over 1 Gbps. In terms of hardware complexity and cost, it is not easy to thus configure the control function unit to include a larger number of interfaces for high-speed wired communication. Furthermore, as the number of antennas cannot be increased to the point where it surpasses the number of the interfaces for wired communication included in the control function unit, extensibility and flexibility of the system are restricted.

On the other hand, in the case where a certain diversity branch is positioned far away from the control function unit, it is required to lay a long communication cable. In terms of cost or availability, it is not always easy to use a long communication cable. There is also a problem that, due to concentration of a large number of communication cables around the control function unit, wiring of cables becomes complicated.

In contrast, there are studies on a daisy-chained diversity reception station in which a plurality of diversity branches (communication units provided with antennas) are connected in serial by communication cables (see Japanese Patent Laid-Open No. 2005-533405 and No. 2004-056346). More specifically, the communication units provided with the antennas are wiredly connected in serial, and each communication unit, for example, combines a signal received via its antenna and a signal received via the antenna of a lower-order unit in the daisy chain, and transfers the combined signals to a higher-order unit. In such case where the communication units provided with their respective antennas are connected in a daisy chain, a control function unit need not include interfaces for wired communication that are equal to the antennas in number. Herein, from a standpoint of one communication unit, a communication unit closer to the control function unit in the daisy chain is referred to as a higher-order unit, and a communication unit farther from the control function unit in the daisy chain is referred to as a lower-order unit. Similarly, from a standpoint of one communication unit, a direction toward the control function unit is referred to as a higher-order direction, and the opposite direction is referred to as a lower-order direction.

Japanese Patent Laid-Open No. 2005-533405 describes a technique in which communication units generate and output a new combined signal and combined confidence index from the following four types of input: a received radio signal, a confidence index thereof, a combined signal received from a lower-order unit in a daisy chain, and a combined confidence index thereof. All of the communication units connected in the daisy chain execute this operation; as a result, the control function unit can obtain weighted and combined received signals from a highest-order communication unit.

Meanwhile, Japanese Patent Laid-Open No. 2004-056346 describes a technique in which a communication unit compares a reception level of a radio signal it has received with a reception level of a radio signal that has been received by and input from a lower-order unit, and accordingly selects a signal to be transmitted to a higher-order unit. More specifically, according to Japanese Patent Laid-Open No. 2004-056346, a communication unit transmits a radio signal it has received together with a reception level thereof to a higher-order unit if a reception level of the radio signal it has received is higher than a reception level of a radio signal received by a lower-order unit. On the other hand, a communication unit relays a radio signal that has been received by and input from a lower-order unit together with a reception level thereof to a higher-order unit if a reception level of a radio signal it has received is equal to or lower than a reception level of the radio signal received by the lower-order unit. This operation is repeated in order from a lowest-order communication unit to a highest-order communication unit; as a result, the control function unit can obtain, from the highest-order communication unit, a signal that has been received by a communication unit with the highest reception level.

However, in order to make meaningful use of the technique described in Japanese Patent Laid-Open No. 2005-533405, a combined signal transmitted between communication units must have a soft-decision value, which gives rise to the problem that an interface for wired communication needs to have a high communication performance. For example, in order to transmit a soft-decision value quantized using 1 byte as a combined signal, an interface for wired communication needs a communication speed eight times faster than a communication speed in radio sections. On the other hand, with the technique described in Japanese Patent Laid-Open No. 2004-056346, a communication unit has to convey a reception level of a radio signal to a higher-order unit, which gives rise to the problem of an increase in the scale of the communication unit as an apparatus, as well as an increase in the amount of information to be transmitted.

The present invention has been made in view of the above problems, and enables achievement of space diversity effects with a simpler apparatus configuration.

SUMMARY OF THE INVENTION

According to one aspect of the present invention, there is provided a communication apparatus in a communication system in which a plurality of communication apparatuses provided with respective antennas are wiredly connected in serial, and a control apparatus receives a signal based on a radio signal received by one of the plurality of communication apparatuses as at least one of the plurality of communication apparatuses selects either a signal based on the radio signal received via the antenna thereof or a signal based on a wired signal received from a first communication apparatus wiredly connected thereto, and transmits the selected signal to one of a second communication apparatus or the control apparatus that is wiredly connected thereto and different from the first communication apparatus, the communication apparatus comprising: a determination unit configured to determine whether or not reception quality of the received radio signal satisfies predetermined quality; and a transmission unit configured to transmit, to one of the second communication apparatus or the control apparatus, the signal based on the received radio signal if the reception quality satisfies the predetermined quality, and the signal based on the wired signal if the reception quality does not satisfy the predetermined quality.

According to one aspect of the present invention, there is provided a communication system including a control unit and a plurality of communication units provided with respective antennas, the plurality of communication units being wiredly connected in serial, the control unit receiving a signal based on a radio signal received by one of the plurality of communication units as at least one of the plurality of communication units selects either a signal based on the radio signal received via the antenna thereof or a signal based on a wired signal received from a first communication unit wiredly connected thereto, and transmits the selected signal to one of a second communication unit or the control unit that is wiredly connected thereto and different from the first communication unit, the at least one of the plurality of communication units comprising: a determination unit configured to determine whether or not reception quality of the received radio signal satisfies predetermined quality; and a transmission unit configured to transmit, to one of the second communication unit or the control unit, the signal based on the received radio signal if the reception quality satisfies the predetermined quality, and the signal based on the wired signal if the reception quality does not satisfy the predetermined quality.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

<<First Embodiment>>

(Configuration of Diversity Reception Apparatus)

Figure 1:
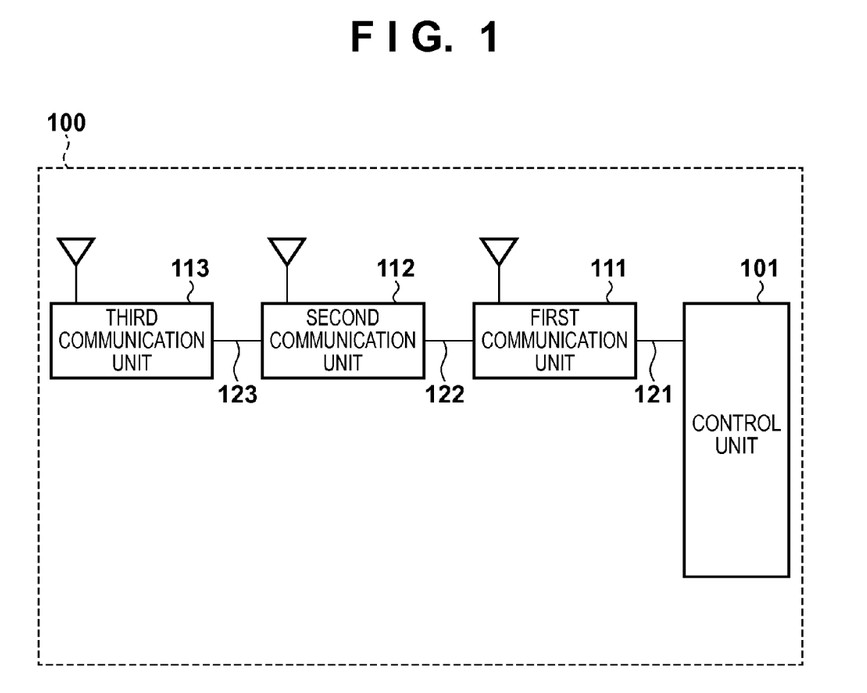
FIG. 1 is a block diagram showing an example of a configuration of a diversity reception apparatus.

FIG. 1 is a block diagram showing an example of a configuration of a diversity reception apparatus 100 according to the present embodiment. The diversity reception apparatus 100 includes a plurality of antennas (diversity branches), a plurality of communication units (first to third communication units 111 to 113) that are in one-to-one correspondence with the plurality of antennas, and a control unit 101. The first to third communication units 111 to 113 are connected to the control unit 101 in a daisy chain. More specifically, the first communication unit 111 is wiredly connected to the control unit 101 via a first communication cable 121, and the second communication unit 112 is wiredly connected to the first communication unit 111 via a second communication cable 122. Similarly, the third communication unit 113 is wiredly connected to the second communication unit 112 via a third communication cable 123. In this way, in the diversity reception apparatus 100, a communication system is constructed in which a plurality of communication units provided with their respective antennas are wiredly connected in serial, with one of the communication units being connected to the control unit 101.

Herein, from a standpoint of a certain communication unit, a direction toward the control unit 101 in the daisy chain is referred to as a higher-order direction, and the opposite direction is referred to as a lower-order direction. That is to say, in FIG. 1, the first communication unit 111 and the third communication unit 113 are respectively a highest-order communication unit and a lowest-order communication unit in the daisy chain. The first communication unit, which is the highest-order communication unit, is wiredly connected to the control unit 101. From a standpoint of the second communication unit 112, the first communication unit 111 is a neighboring higher-order communication unit, and the third communication unit 113 is neighboring lower-order communication unit.

(Configuration of Communication Units)

Figure 2:
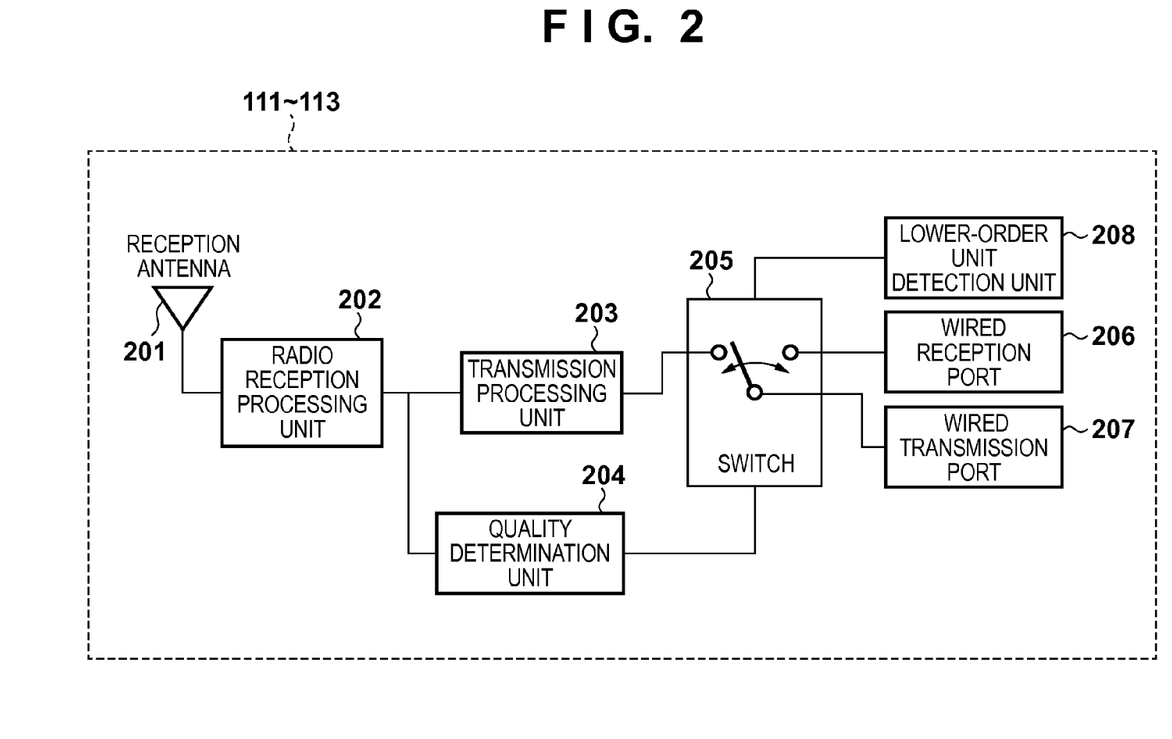
FIG. 2 is a block diagram showing an example of a configuration of a communication unit.

FIG. 2 is a block diagram showing an example of a configuration of the first to third communication units 111 to 113 according to the present embodiment. The communication units include, for example, a reception antenna 201, a radio reception processing unit 202, a transmission processing unit 203, a quality determination unit 204, a switch 205, a wired reception port 206, a wired transmission port 207, and a lower-order unit detection unit 208.

Figure 3:
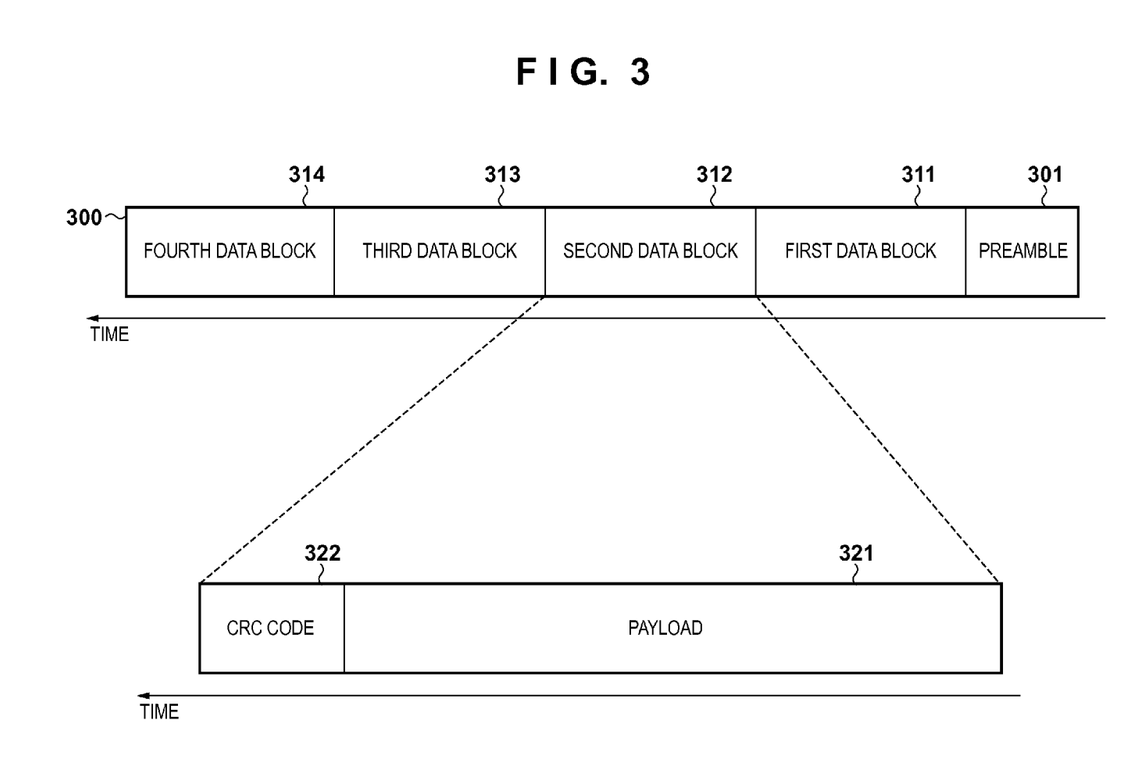
FIG. 3 shows an example of a frame configuration of a radio signal.

The reception antenna 201 receives a radio signal and outputs the received radio signal to the radio reception processing unit 202. An example of a frame configuration of the radio signal is shown in FIG. 3. In FIG. 3, a radio frame 300 includes a preamble 301 and first to fourth data blocks 311 to 314. The preamble 301 is a known waveform pattern affixed to the head of the radio frame 300, and used in detection of the radio signal, synchronization, gain adjustment for a reception circuit, and the like. The data blocks 311 to 314 include a payload 321 and a CRC code 322. The payload 321 is an area in the radio frame 300 for storing data conveyed from a transmission apparatus, which is not shown in the drawings, to the diversity reception apparatus 100. The CRC code 322 is an error-detection bit sequence obtained by applying CRC coding to the payload 321 using a predetermined generator polynomial. That is to say, the first to fourth data blocks 311 to 314 are data sequences obtained by applying CRC coding to the payload 321. It should be noted that the frame configuration described herein serves as an example, and the diversity reception apparatus 100 according to the present embodiment is compatible with radio signals of any frame configuration.

The radio reception processing unit 202 obtains radio reception data by applying predetermined reception processing to the radio signal acquired from the reception antenna 201. For example, the radio reception data is obtained by downconverting a radio-frequency signal into a baseband and then executing processing such as AD conversion, channel equalization, and error-correction decoding. The radio reception data thus obtained is output to the transmission processing unit 203 and the quality determination unit 204.

The transmission processing unit 203 generates a signal to be transmitted to a higher-order unit by applying predetermined transmission processing to the radio reception data input from the radio reception processing unit 202. For example, this signal is generated by applying 8b/10b coding to the radio reception data and then causing the radio reception data to pass through a waveform formation filter. It should be noted that, while the signal generated by the transmission processing unit 203 is a signal for wired communication based on the radio signal received by the reception antenna 201 and differs from the received signal itself, it will hereinafter be referred to as a "radio reception signal" for ease of description. The generated radio reception signal is input to the switch 205.

The wired reception port 206 is a terminal for receiving a signal transmitted from the wired transmission port 207 in a lower-order communication unit via a communication cable. For example, a wired signal transmitted from the wired transmission port 207 in the third communication unit 113 is received by the wired reception port 206 in the second communication unit 112 via the third communication cable 123. The signal received by the wired reception port 206 is input to the switch 205 as a wired reception signal.

Based on the radio reception data from the radio reception processing unit 202, the quality determination unit 204 determines whether or not reception quality of the received radio signal satisfies predetermined quality. For example, the quality determination unit 204 conducts error detection for the first to fourth data blocks 311 to 314 using CRC codes, and if no error is included, determines that the reception quality satisfies the predetermined quality. Conversely, if error is included, it determines that the reception quality does not satisfy the predetermined quality. The result of determination by the quality determination unit 204 is input to the switch 205.

While the reception quality of the radio signal is evaluated based on the radio reception data output from the radio reception processing unit 202 in the above description, the evaluation is not limited in this way. For example, the reception quality may be determined to satisfy the predetermined quality if a received electric power of the preamble 301, which is calculated by way of correlation detection, is equal to or larger than a predetermined value. Alternatively, whether or not the reception quality satisfies the predetermined quality may be determined by, for example, comparing indexes of the radio signal, such as a signal to noise power ratio (SNR), a carrier to noise power ratio (CNR), a received electric field intensity, an error vector magnitude (EVM), and an error rate, with predetermined values indicating whether or not the reception quality is sufficient.

The lower-order unit detection unit 208 detects whether or not another communication unit exists in the lower-order direction in the daisy chain. More specifically, the lower-order unit detection unit 208 determines whether or not the communication unit in which it is included is the lowest-order communication unit in the daisy chain. For example, in the case where a very small electric current is arranged to be supplied from a lower-order unit to a higher-order unit via a communication cable connected therebetween, the lower-order unit detection unit 208 determines whether or not another communication unit exists in the lower-order direction through observation of this electric current. Alternatively, the lower-order unit detection unit 208 may determine whether or not another communication unit exists in the lower-order direction by receiving, via external input and the like, an explicit designation indicating whether or not the communication unit in which it is included is the lowest-order communication unit. The result of determination by the lower-order unit detection unit 208 is input to the switch 205.

The switch 205 selects one of the two input signals, that is to say, the radio reception signal from the transmission processing unit 203 and the wired reception signal from the wired reception port 206, and outputs the selected input signal as a transmission signal. At this time, the switch 205 selects the signal to be output based on the result of determination by the quality determination unit 204 about the reception quality and on the result of determination by the lower-order unit detection unit 208. The signal selected by the switch 205 is output to the wired transmission port 207 and wiredly transmitted to a neighboring higher-order communication unit. The wired transmission port 207 is a terminal for transmitting the signal selected by the switch 205 to the higher-order communication unit via a communication cable.

It should be noted that the constituents shown in FIG. 2 may be provided as hardware, or at least a part of the constituents may be provided as software. In the case where the constituents are provided as software, the communication units operate to execute the above-described functions due to CPUs mounted on the communication units executing programs stored in memories as appropriate.

(Operation of Switch)

Figure 4:
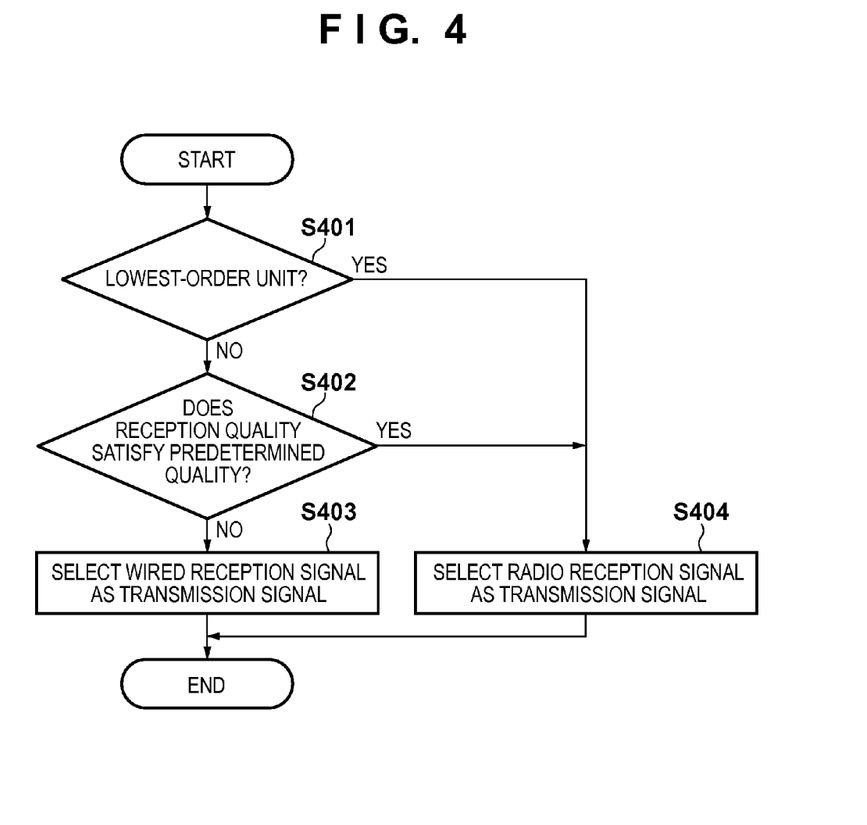
FIG. 4 is a flowchart showing an example of an operation of processing through which a switch selects a signal.

FIG. 4 is a flowchart showing an example of an operation of processing through which the switch 205 selects a transmission signal in the present embodiment. When the processing is started, the switch 205 first determines whether or not the communication unit in which it is included is the lowest-order communication unit in a daisy chain (step S401). If the switch 205 determines that the communication unit in which it is included is the lowest-order unit (YES of step S401), it selects a radio reception signal as the transmission signal regardless of reception quality of a radio signal (step S404).

On the other hand, if the communication unit in which the switch 205 is included is not the lowest-order unit (NO of step S401), whether or not the reception quality of the radio signal satisfies predetermined quality is determined subsequently (step S402). If the reception quality satisfies the predetermined quality (YES of step S402), the switch 205 selects the radio reception signal as the transmission signal (step S404). On the other hand, if the reception quality of the radio signal does not satisfy the predetermined quality (NO of step S402), the switch 205 selects a wired reception signal as the transmission signal (step S403).

(Example of Operation of Diversity Reception Apparatus)

Figure 5:
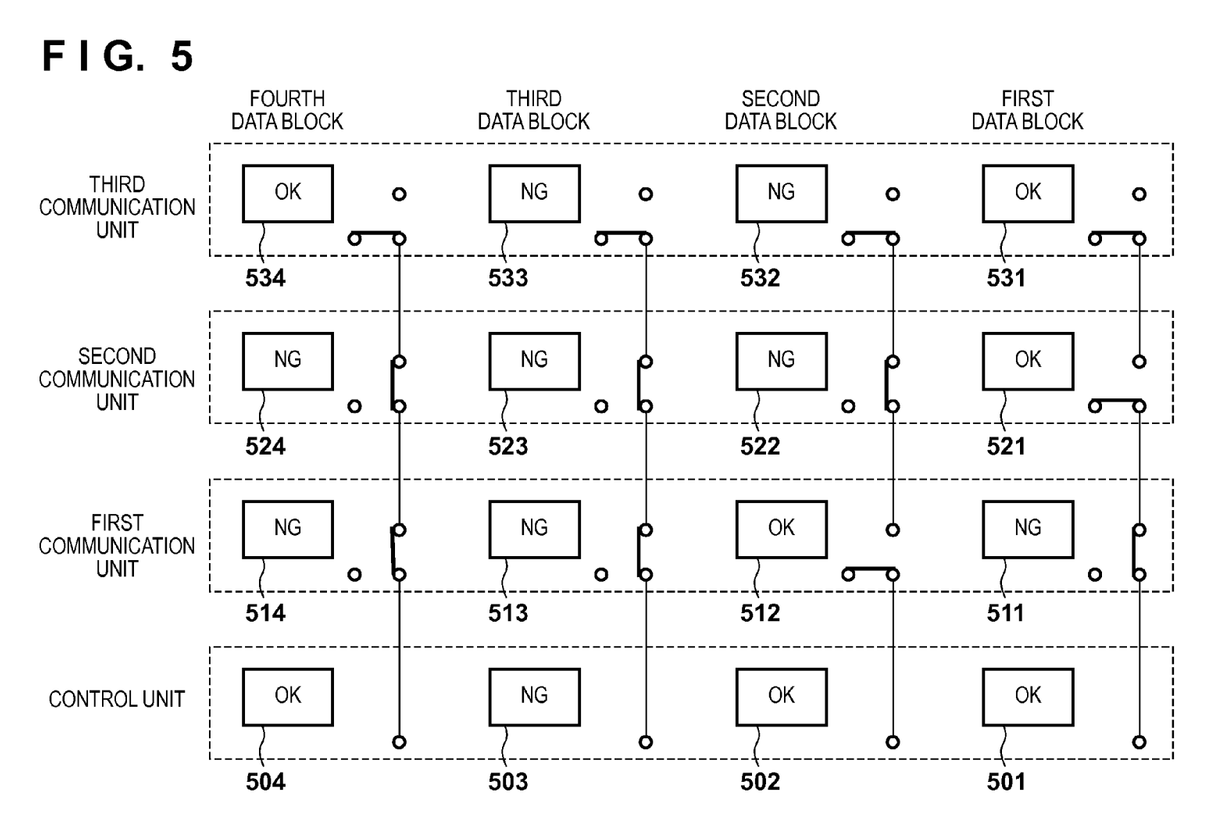
FIG. 5 shows an example of an operation of the diversity reception apparatus.

FIG. 5 shows an example of an operation of the diversity reception apparatus 100 according to the present embodiment. First, a description is given of processing of the first to third communication units 111 to 113 with respect to a first data block. The third communication unit 113 is the lowest-order communication unit. Therefore, the third communication unit 113 transmits a radio reception signal, which has been received as a radio signal and generated based on a first data block 531, to the higher-order second communication unit 112 as a transmission signal, regardless of whether or not reception quality satisfies predetermined quality.

The second communication unit 112 is not the lowest-order communication unit. Therefore, the second communication unit 112 selects one of a radio reception signal and a wired reception signal as a signal to be transmitted to the higher-order first communication unit 111 depending on whether or not communication quality of a radio signal satisfies the predetermined quality. In the example of FIG. 5, the reception quality of a first data block 521 received by the second communication unit 112 satisfies the predetermined quality (indicated as "OK" in FIG. 5). The second communication unit 112 accordingly transmits the radio reception signal based on the received radio signal to the first communication unit 111 as a transmission signal.

Similarly, the first communication unit 111 selects one of a radio reception signal and a wired reception signal as a signal to be transmitted to the control unit 101 depending on whether or not communication quality of a radio signal satisfies the predetermined quality. In the example of FIG. 5, the reception quality of a first data block 511 received by the first communication unit 111 does not satisfy the predetermined quality (indicated as "NG" in FIG. 5). The first communication unit 111 accordingly transmits the wired reception signal received from the second communication unit 112 via wired communication to the control unit 101.

The control unit 101 obtains reception data by applying predetermined wired reception processing to the signal received from the first communication unit 111 via wired communication. For example, the control unit 101 obtains the reception data by causing the received signal to pass through an equalization filter and then applying clock data recovery and 10b/8b decoding to the received signal. As a result, a first data block 501 received by the control unit 101 is based on the radio signal received by the second communication unit 112, and the control unit 101 can acquire data that satisfies the predetermined quality.

Similarly, with regard to a second data block, the third communication unit 113 transmits a radio reception signal to the second communication unit 112 regardless of reception quality of a radio signal. With regard to the second data block, the second communication unit transmits a wired reception signal received from the third communication unit 113 to the first communication unit 111 as reception quality does not satisfy the predetermined quality. With regard to the second data block, the first communication unit 111 transmits a radio reception signal based on a radio signal it has received to the control unit 101 as reception quality satisfies the predetermined quality. As a result, the control unit 101 can acquire data whose reception quality satisfies the predetermined quality based on the signal from the first communication unit 111. Similarly, with regard to a fourth data block, a radio reception signal that has been generated by the third communication unit 113, in which a radio signal satisfies the predetermined quality, is delivered to the control unit 101.

Next, a description is given of processing of the first to third communication units 111 to 113 with respect to a third data block. In the present example, in all of the first to third communication units 111 to 113, reception quality of a radio signal does not satisfy the predetermined quality. Therefore, the first communication unit 111 and the second communication unit 112 transfer a wired reception signal received from a lower-order unit. On the other hand, the third communication unit 113 transmits a radio reception signal based on the received radio signal to the second communication unit 112 as a lower-order unit does not exist. As a result, the control unit 101 receives the radio reception signal generated by the third communication unit 113.

As described above, even in the case where reception quality of a radio signal does not satisfy the predetermined quality in all of the communication units, a radio reception signal of the lowest-order unit is delivered to the control unit 101, thereby preventing the control unit 101 from failing to acquire any radio signal. It should be noted that, even in the case where the reception quality of the radio signal does not satisfy the predetermined quality, if, for example, received data includes an accurate portion, the control unit 101 can cause a transmission apparatus, which is not shown in the drawings, to transmit the rest of the data after applying more robust error-correction coding thereto. This increases the probability of accurately receiving all of the rest of the data at the time of retransmission, and hence reduces the number of retransmission. Furthermore, for example, in a system that tolerates a certain level of error, it may be sufficient to accurately receive partial data. In view of this, as long as a radio signal received by one of the communication units (a radio reception signal generated based thereon) is delivered to the control unit 101, the above-described advantageous effects can be achieved.

Also, in the present embodiment, any communication unit other than the lowest-order communication unit selects one of a radio reception signal and a wired reception signal as a transmission signal to a lower-order unit by determining only whether or not reception quality of a radio signal satisfies the predetermined quality. Therefore, there is no need to acquire reception quality in a higher-order unit, and the transmission signal can be selected with a simpler configuration based only on a wireless environment of a communication unit itself.

In the present embodiment, for example, in the case where the predetermined quality of a radio signal is SNR of 8 dB, if SNR in a communication unit is 10 dB and SNR in a higher-order unit is 15 dB, the communication unit selects a radio reception signal as a transmission signal. In other words, no matter how excellent the quality of a radio signal is in the higher-order unit, as long as reception quality of a radio signal received by the communication unit satisfies the predetermined quality, the communication unit selects a radio reception signal based on the received radio signal as a signal to be transmitted to a lower-order unit. Therefore, in the present embodiment, it is not necessarily the case that a signal from a communication unit with a radio signal of the best reception quality is delivered to the control unit 101. However, even so, a radio reception signal delivered to the control unit 101 is still generated by a communication unit in which reception quality satisfies the predetermined quality, and hence data that is ultimately received is guaranteed sufficient communication quality. Therefore, the diversity reception apparatus 100 according to the present embodiment can achieve sufficient space diversity effects with a simple configuration.

<<Second Embodiment>>

If a reception level of a radio signal in a lowest-order unit is deteriorated to, for example, the level of noise and reception qualities of radio signals in other communication units do not satisfy predetermined quality, the control unit 101 may not be able to acquire meaningful data. For example, in the example of the configuration of the diversity reception apparatus shown in FIG. 1, the third communication unit 113 generates a radio reception signal and transmits the generated radio reception signal to the second communication unit 112 assuming that a radio signal has been received, even if a reception level is extremely low to the point where the radio signal cannot be detected. If reception qualities of radio signals do not satisfy the predetermined quality in the first communication unit 111 and the second communication unit 112, the first communication unit 111 and the second communication unit 112 transfer this radio reception signal toward the control unit 101. Consequently, the control unit 101 acquires the radio reception signal generated by the third communication unit 113 that has not been able to detect the radio signal, and hence fails to obtain meaningful data.

On the other hand, even if the reception qualities of the radio signals do not satisfy the predetermined quality in the first communication unit 111 and the second communication unit 112, these communication units may receive the radio signals at a level that allows for acquisition of a part of data. In view of this, the present embodiment causes a radio reception signal based on a radio signal received at a certain level to be transmitted to the control unit 101 in the foregoing case so as to increase the probability that the control unit 101 can acquire meaningful data. It should be noted that, in an exemplary case described below, the configuration of the diversity reception apparatus 100 is similar to the one described in the first embodiment.

(Configuration of Communication Units)

Figure 6:
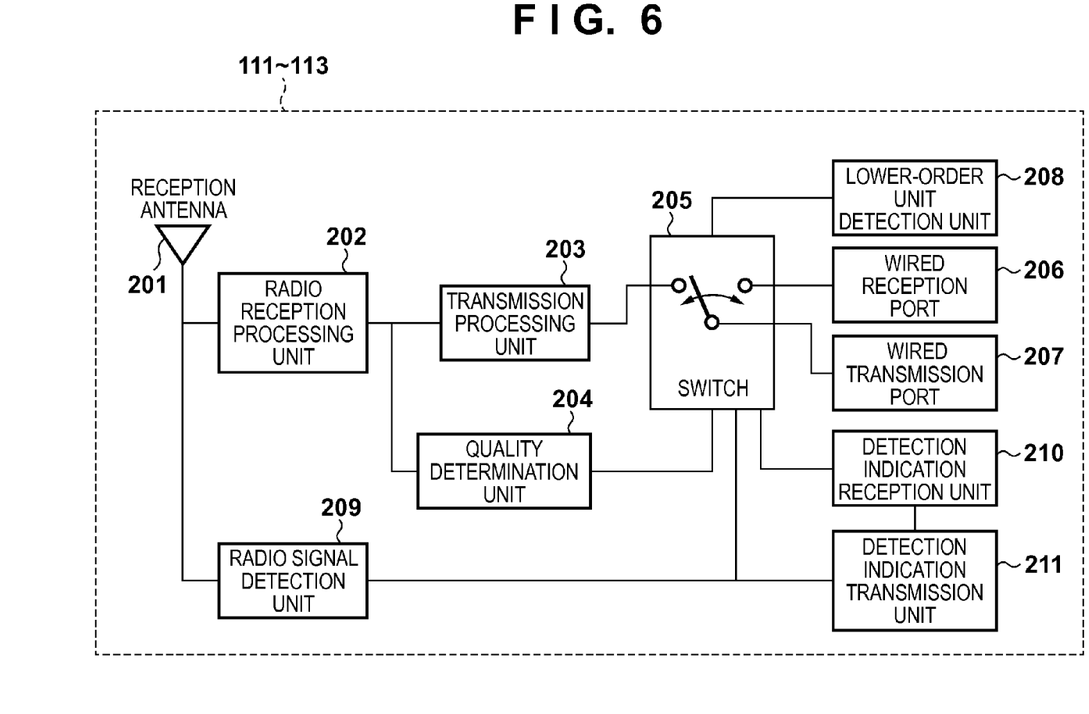
FIG. 6 is a block diagram showing an example of a configuration of a communication unit according to a second embodiment.

FIG. 6 shows an example of a configuration of the first to third communication units 111 to 113 according to the present embodiment. The communication units shown in FIG. 6 have the configuration of the communication units shown in FIG. 2, with the addition of a radio signal detection unit 209, a detection indication reception unit 210, and a detection indication transmission unit 211. Furthermore, the switch 205 receives, as input, a radio signal detection notification from the radio signal detection unit 209, as well as a detection indication from the detection indication reception unit 210 indicating that a lower-order unit has detected a radio signal. These two types of input are used by the switch 205 as criteria in selecting a signal to be transmitted to a higher-order unit.

The radio signal detection unit 209 detects an arrival of a radio signal through observation of an electric signal input from the reception antenna 201, and outputs a radio signal detection notification. For example, the radio signal detection unit 209 applies a matched filter conforming to a preamble 301 to the electric signal from the reception antenna 201, and determines that the radio signal has arrived if an output level of the matched filter exceeds a predetermined threshold. The detection notification generated by the radio signal detection unit 209 is transmitted to the switch 205 and the detection indication transmission unit 211. While the radio signal detection unit 209 detects the existence of the radio signal through observation of the electric signal from the reception antenna 201 in the foregoing example, the detection is not limited in this way. For example, the radio signal detection unit 209 may generate the detection notification based on outputting of radio reception data from the radio reception processing unit 202.

The detection indication reception unit 210 receives a detection indication transmitted from the detection indication transmission unit 211 in a lower-order communication unit. In other words, the detection indication reception unit 210 is a functional unit that acquires information indicating whether or not the lower-order communication unit has been able to detect a radio signal, and can discover that the lower-order communication unit has been able to detect the radio signal upon receiving the detection indication. The detection indication is transmitted via, for example, a communication cable used in wired communication between the wired reception port 206 and the wired transmission port 207 in the lower-order unit over a signal band different from a signal band for the wired communication. Here, the signal band over which the detection indication is transmitted may be at 0 Hz, that is to say, DC components. Upon receiving the detection indication, the detection indication reception unit 210 outputs the received detection indication to the switch 205 and the detection indication transmission unit 211.

If the detection indication transmission unit 211 receives, as input, the detection notification from the radio signal detection unit 209 or the detection indication from the detection indication reception unit 210, it transmits, to a higher-order unit, a detection indication indicating that a radio signal has been detected by the communication unit in which it is included or by the lower-order communication unit. That is to say, if a signal to be transmitted to the higher-order unit is based on a radio signal that has been received with an electric power of a detectable level, the detection indication transmission unit 211 transmits the detection indication additionally.

Similarly to the first embodiment, the switch 205 selects one of two input signals, that is to say, a radio reception signal input from the transmission processing unit 203 and a wired reception signal input from the wired reception port 206, as a transmission signal to the higher-order unit. At this time, the detection notification from the radio signal detection unit 209 and the detection indication from the detection indication reception unit 210 are used as criteria in selecting the transmission signal in addition to the two values used in the first embodiment. The signal selected by the switch 205 as the wired transmission signal is output to the wired transmission port 207.

It should be noted that, similarly to the first embodiment, the constituents shown in FIG. 6 may be provided as hardware, or at least a part of the constituents may be provided as software. In the case where the constituents are provided as software, the communication units operate to execute the above-described functions due to CPUs mounted on the communication units executing programs stored in memories as appropriate.

(Operation of Switch)

Figure 7:
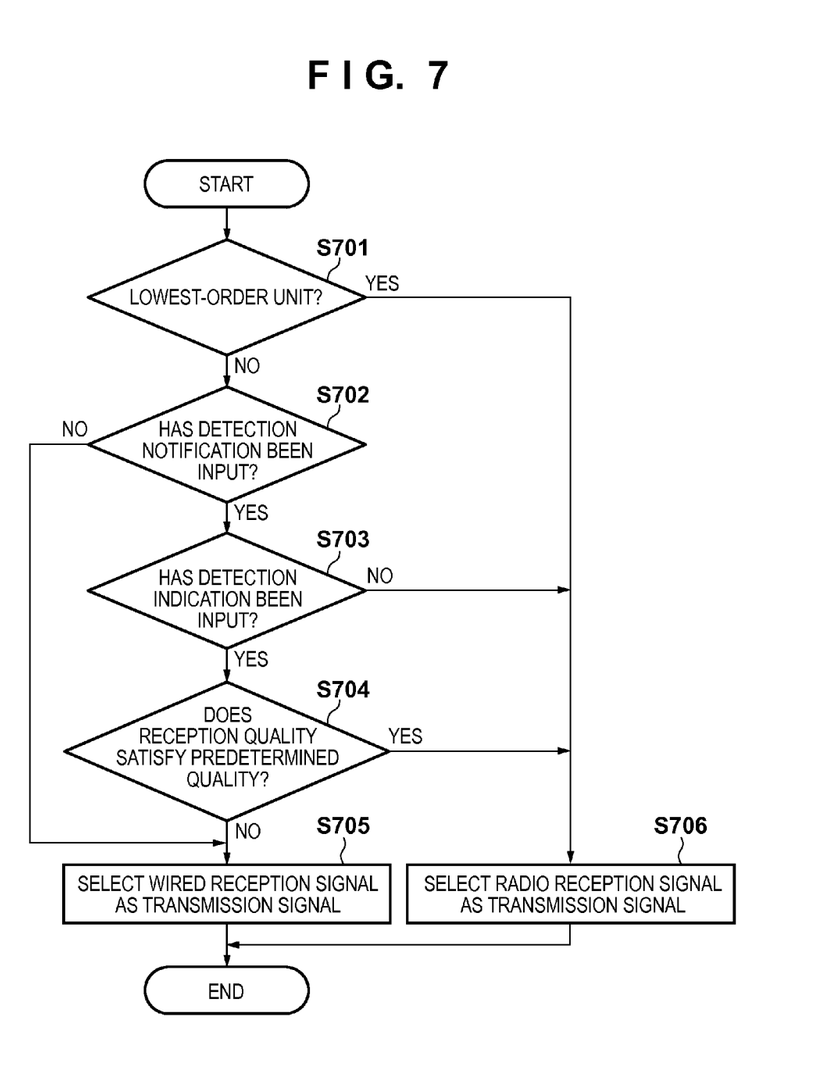
FIG. 7 is a flowchart showing an example of an operation of processing through which a switch selects a signal in the second embodiment.

FIG. 7 is a flowchart showing an example of an operation of processing through which the switch 205 selects a transmission signal in the present embodiment. When the processing is started, the switch 205 first determines whether or not the communication unit in which it is included is the lowest-order communication unit in a daisy chain (step S701). If the switch 205 determines that the communication unit in which it is included is the lowest-order unit (YES of step S701), it selects a radio reception signal as the transmission signal regardless of whether or not a radio signal has been detected and of reception quality of the radio signal (step S706).

On the other hand, if the switch 205 determines that the communication unit in which it is included is not the lowest-order unit (NO of step S701), it determines whether or not a detection notification has been input from the radio signal detection unit 209, that is to say, whether or not the communication unit in which it is included has detected the radio signal (step S702). If the detection notification has not been input from the radio signal detection unit 209 (NO of step S702), it recognizes that the communication unit in which it is included has not been able to detect the radio signal. In this case, the switch 205 accordingly selects a wired reception signal from a lower-order unit as the transmission signal to a higher-order unit (step S705). If the detection notification has been input from the radio signal detection unit 209 (YES of step S702), the switch 205 determines whether or not a detection indication has been input from the detection indication reception unit 210, that is to say, whether or not a radio signal has been detected by any lower-order communication unit (step S703).

If the detection indication has not been input from the detection indication reception unit 210 (NO of step S703), it can be determined that the wired reception signal received from the lower-order unit has been generated without any detection of radio signals. Therefore, the switch 205 does not transfer such a wired reception signal, which is considered to include no meaningful data, and selects the radio reception signal based on the radio signal received by the communication unit in which it is included as the signal to be transmitted to the higher-order node (step S706). On the other hand, if the detection indication has been input from the detection indication reception unit 210 (YES of step S703), the switch 205 subsequently determines whether or not reception quality of the radio signal satisfies the predetermined quality in the communication unit in which it is included (step S704).

If the reception quality of the radio signal satisfies the predetermined quality (YES of step S704), the switch 205 selects the radio reception signal generated based on the radio signal as the signal to be transmitted to the higher-order unit (step S706). On the other hand, if the reception quality of the radio signal does not satisfy the predetermined quality (NO of step S704), the switch 205 selects the wired reception signal received from the lower-order unit as the signal to be transmitted to the higher-order unit (step S705).

(Example of Operation of Diversity Reception Apparatus)

Figure 8:
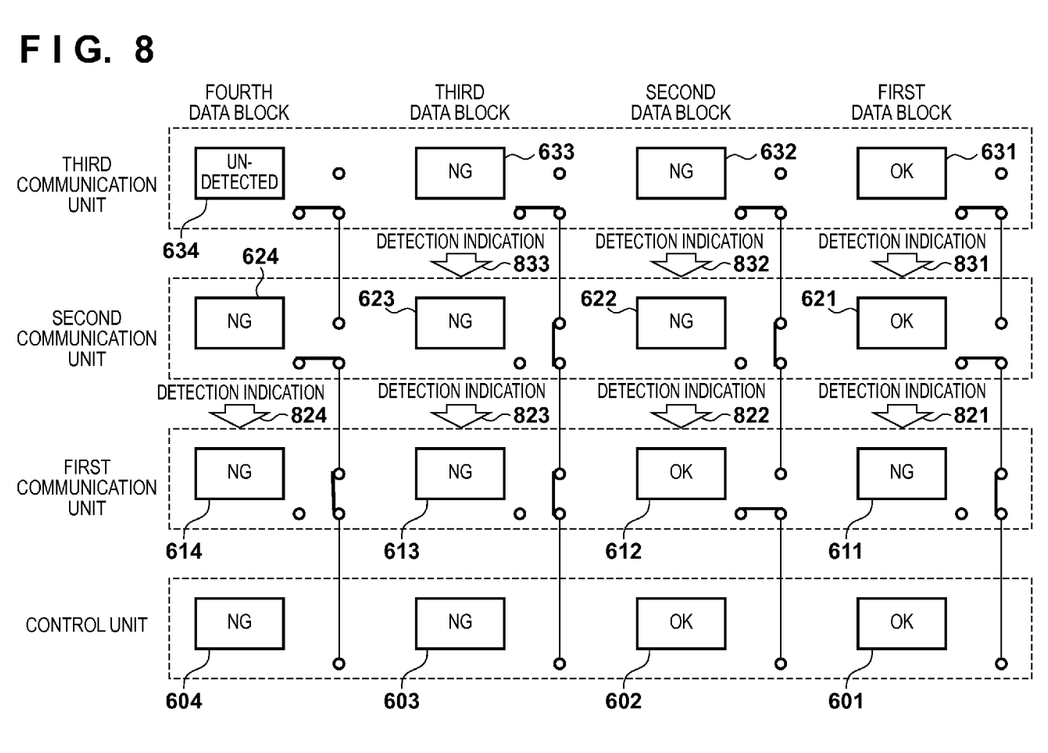
FIG. 8 shows an example of an operation of a diversity reception apparatus according to the second embodiment.

FIG. 8 shows an example of an operation of the diversity reception apparatus 100 according to the present embodiment. In FIG. 8, a dashed line indicates the case where a radio signal has not been able to be detected. That is to say, FIG. 8 shows an exemplary case where the third communication unit 113 has not been able to detect a radio signal with respect to a fourth data block. It should be noted that a quadrilateral with a solid line indicates that a radio signal has been detected, whether it shows "OK" or "NG". Therefore, in the case of this quadrilateral, the communication units generate a detection notification. Furthermore, in FIG. 8, arrows 821 to 824 and 831 to 833 represent a detection indication indicating that a radio signal has been detected by a lower-order unit. In the present example, with respect to first to third data blocks, the first to third communication units 111 to 113 have been able to detect a radio signal, and hence a resultant operation thereof is similar to the one described in the first embodiment. Therefore, the following describes processing with respect to the fourth data block.

The third communication unit 113 is not able to detect a radio signal including a fourth data block 634 because a reception level of the radio signal is significantly low. Therefore, the radio reception processing unit 202 cannot generate reception data, with the result that the third communication unit 113 does not transmit a meaningful wired transmission signal. Furthermore, as the third communication unit 113 is not able to detect the radio signal, it does not transmit a detection indication to the second communication unit 112.

On the other hand, the second communication unit 112 has been able to detect a radio signal, although reception quality does not satisfy the predetermined quality; therefore, the radio signal detection unit 209 therein generates a detection notification. The second communication unit 112, however, does not receive a detection indication from the third communication unit 113. The second communication unit 112 thus transmits a radio reception signal based on the radio signal it has received to the first communication unit 111 without determining whether or not reception quality of the received radio signal satisfies the predetermined quality. At this time, the second communication unit 112 also transmits a detection indication to the first communication unit 111 as it has been able to detect the radio signal.

The first communication unit 111, which is able to detect a radio signal, determines whether or not reception quality of the radio signal satisfies the predetermined quality as the radio signal detection unit 209 therein generates a detection notification and the detection indication has been received from the second communication unit 112. In the present example, the first communication unit 111 transmits a wired reception signal received from the second communication unit 112 to the control unit 101 as the reception quality of the received radio signal does not satisfy the predetermined quality.

As a result, even though the third communication unit 113, which is the lowest-order communication unit, has not been able to detect the radio signal, the control unit 101 can receive a signal based on the radio signal received by the second communication unit 112.

While the first communication unit 111 does not transmit a detection indication in the example of FIG. 8, it is not limited in this way. For example, the first communication unit 111 may transmit the detection indication to the control unit 101 in accordance with the above-described condition. In this case, if the control unit 101 does not receive the detection indication, it can determine that it has not been able to acquire a meaningful signal, and therefore can suppress the electric power consumption and the like by refraining from executing demodulation and other processing.

Through the above-described processing, if a communication unit other than the lowest-order communication unit has been able to detect a radio signal while a lower-order unit has not been able to detect a radio signal, the communication unit transmits a radio reception signal to a higher-order unit even if reception quality does not satisfy the predetermined quality.

In this way, the control unit 101 can receive some sort of data based on a radio signal, even if the lowest-order communication unit has not detected a radio signal due to a low reception level and reception quality of a radio signal does not satisfy the predetermined quality in a higher-order communication unit.

With the present invention, space diversity effects can be achieved with a simpler apparatus configuration.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-123175, filed Jun. 11, 2013, which is hereby incorporated by reference herein in its entirety.

What is claimed is:

1. A communication apparatus in a communication system in which a plurality of communication apparatuses provided with respective antennas a rewiredly connected in serial, and a control apparatus receives a signal based on a radio signal received by one of the plurality of communication apparatuses as at least one of the plurality of communication apparatuses selects either a signal based on the radio signal received via the antenna thereof or a signal based on a wired signal received from a first communication apparatus wiredly connected thereto, and transmits the selected signal to one of a second communication apparatus or the control apparatus that is wiredly connected thereto and different from the first communication apparatus, the communication apparatus comprising:

a determiner that determines whether or not reception quality of the received radio signal satisfies predetermined quality; and a transmitter that transmits, to one of the second communication apparatus or the control apparatus, the signal based on the received radio signal if the reception quality satisfies the predetermined quality, and the signal based on the wired signal if the reception quality does not satisfy the predetermined quality, wherein the determiner further determines whether or not the radio signal has been to be detected via the antenna, and wherein if the determiner determines that the radio signal has been detected via the antenna and the wired signal has not been transmitted by the first communication apparatus, the transmitter transmits the signal based on the received radio signal to one of the second communication apparatus or the control apparatus regardless of the reception quality.

2. The communication apparatus according to claim 1, further comprising a detector to detect an existence of the first communication apparatus, wherein if the first communication apparatus does not exist, the transmitter transmits the signal based on the received radio signal to one of the second communication apparatus or the control apparatus regardless of the reception quality.

3. The communication apparatus according to claim 1, wherein if the radio signal has not been able to be detected via the antenna, the transmitter transmits the signal based on the wired signal to one of the second communication apparatus or the control apparatus.

4. A communication apparatus in a communication system in which a plurality of communication apparatuses provided with respective antennas are wiredly connected in serial, and a control apparatus receives a signal based on a radio signal received by one of the plurality of communication apparatuses as at least one of the plurality of communication apparatuses selects either a signal based on the radio signal received via the antenna thereof for a signal based on a wired signal received from a first communication apparatus wiredly connected thereto, and transmits the selected signal to one of a second communication apparatus or the control apparatus that is wiredly connected thereto and different from the first communication apparatus, the communication apparatus comprising:

a determiner that determines whether or not reception quality of the received radio signal satisfies predetermined quality;

a transmitter that transmits, to one of the second communication apparatus or the control apparatus, the signal based on the received radio signal if the reception quality does not satisfy the predetermined quality; and an acquirer that acquires information indicating whether or not the first communication apparatus has been able to detect the radio signal, wherein the determiner further determines whether or not the radio signal has been able to be detected via the antenna, wherein if the radio signal has not been able to be detected via the antenna, the transmitter transmits the signal based on the wired signal to one of the second communication apparatus or the control apparatus, and wherein if the determiner determines that the radio signal has been detected via the antenna and the first communication apparatus has not been able to detect the radio signal, the transmitter transmits the signal based on the received radio signal to one of the second communication apparatus or the control apparatus regardless of the reception quality.

5. The communication apparatus according to claim 1, further comprising an acquirer to acquire information indicating whether or not the first communication apparatus has been able to detect the radio signal, wherein if the first communication apparatus has not been able to detect the radio signal, the transmitter transmits the signal based on the received radio signal to one of the second communication apparatus or the control apparatus regardless of the reception quality.

6. A communication system including a control unit and a plurality of communication units provided with respective antennas, the plurality of communication units being wiredly connected in serial, the control unit receiving a signal based on a radio signal received by one of the plurality of communication units as at least one of the plurality of communication units selects either a signal based on the radio signal received via the antenna thereof or a signal based on a wired signal received from a first communication unit wiredly connected thereto, and transmits the selected signal to one of a second communication unit or the control unit that is wiredly connected thereto and different from the first communication unit, the at least one of the plurality of communication units comprising:
a determiner that determines whether or not reception quality of the received radio signal satisfies predetermined quality; and
a transmitter that transmits, to one of the second communication unit or the control unit, the signal based on the received radio signal if the reception quality satisfies the predetermined quality, and the signal based on the wired signal if the reception quality does not satisfy the predetermined quality,
wherein the determiner further determines whether or not the radio signal has been able to be detected via the antenna, and
wherein if the determiner determines that the radio signal has been detected via the antenna and the wired signal has not been transmitted by the first communication apparatus, the transmitter transmits the signal based on the received radio signal to one of the second communication apparatus or the control apparatus regardless of the reception quality.

7. A communication method for at least one of a plurality of communication apparatuses in a communication system in which the plurality of communication apparatuses are provided with respective antennas and wiredly connected in serial, and a control apparatus receives a signal based on a radio signal received by one of the plurality of communication apparatuses as the at least one of the plurality of communication apparatuses selects either a signal based on the radio signal received via the antenna thereof or a signal based on a wired signal received from a first communication apparatus wiredly connected thereto, and transmits the selected signal to one of a second communication apparatus or the control apparatus that is wiredly connected thereto and different from the first communication apparatus, the communication method comprising:

determining, by a determination unit, whether or not reception quality of the received radio signal satisfies predetermined quality; and
transmitting, by a transmission unit, the signal based on the received radio signal if the reception quality satisfies the predetermined quality, and the signal based on the wired signal if the reception quality does not satisfy the predetermined quality, to one of the second communication apparatus or the control apparatus,
wherein in the determining, it is further determined whether or not the radio signal has been able to be detected via the antenna, and
wherein if it is determined that the radio signal has been detected via the antenna and the wired signal has not been transmitted by the first communication apparatus, the signal based on the received radio signal is transmitted to one of the second communication apparatus or the control apparatus regardless of the reception quality.

8. A non-transitory computer-readable storage medium storing a computer program for causing a computer to execute the following steps, the computer being mounted on at least one of a plurality of communication apparatuses in a communication system in which the plurality of communication apparatuses are provided with respective antennas and wiredly connected in serial, and a control apparatus receives a signal based on a radio signal received by one of the plurality of communication apparatuses as the at least one of the plurality of communication apparatuses selects either a signal based on the radio signal received via the antenna thereof or a signal based on a wired signal received from a first communication apparatus wiredly connected thereto, and transmits the selected signal to one of a second communication apparatus or the control apparatus that is wiredly connected thereto and different from the first communication apparatus:

determining whether or not reception quality of the received radio signal satisfies predetermined quality; and
transmitting, to one of the second communication apparatus or the control apparatus, the signal based on the received radio signal if the reception quality satisfies the predetermined quality, and the signal based on the wired signal if the reception quality does not satisfy the predetermined quality,
wherein in the determining, it is further determined whether or not the radio signal has been to be detected via the antenna, and
wherein if it is determined that the radio signal has been detected via the antenna and the wired signal has not been transmitted by the first communication apparatus, the signal based on the received radio signal is transmitted to one of the second communication apparatus or the control apparatus regardless of the reception quality.

* * * * *